United States Patent
Fujita

(10) Patent No.: US 7,309,006 B2
(45) Date of Patent: Dec. 18, 2007

(54) SETTLEMENT TERMINAL

(75) Inventor: Kenji Fujita, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 454 days.

(21) Appl. No.: 10/940,234

(22) Filed: Sep. 13, 2004

(65) Prior Publication Data
US 2005/0165675 A1 Jul. 28, 2005

(30) Foreign Application Priority Data
Jan. 28, 2004 (JP) ............... 2004-019559

(51) Int. Cl.
G07F 19/00 (2006.01)
(52) U.S. Cl. .............. 235/379; 235/383; 235/375
(58) Field of Classification Search ............. 235/383, 235/379, 375; 705/39, 26; 725/32, 25, 91
See application file for complete search history.

(56) References Cited

U.S. PATENT DOCUMENTS 7,025,274 B2 * 4/2006 Solomon et al. ....... 235/472.01

2001/0037251 A1 * 11/2001 Nojima et al. ............... 705/26
2002/0147981 A1 * 10/2002 Ohta et al. ..................... 725/93

FOREIGN PATENT DOCUMENTS

JP 2001-256566 A 9/2001

* cited by examiner

Primary Examiner—Karl D. Frech
(74) Attorney, Agent, or Firm—Frishauf, Holtz, Goodman & Chick, P.C.

(57) ABSTRACT

To prevent skimming of card data used in electronic payment, attention is given to a phenomenon occurring in performing the fraudulent act of attaching a skimmer to a settlement terminal—namely that the settlement terminal is turned on and off several times. Detected power-on/off abnormalities are determined in accordance with an abnormal power-on/off definition stored in a memory. This may, for example, be that when the number of times the settlement terminal is turned on or off within a specified time period exceeds a predetermined number, the power-on/off is defined as abnormal power-on/off. When the power-on/off is determined to be abnormal, warning information is sent to a settlement organ computer.

18 Claims, 4 Drawing Sheets

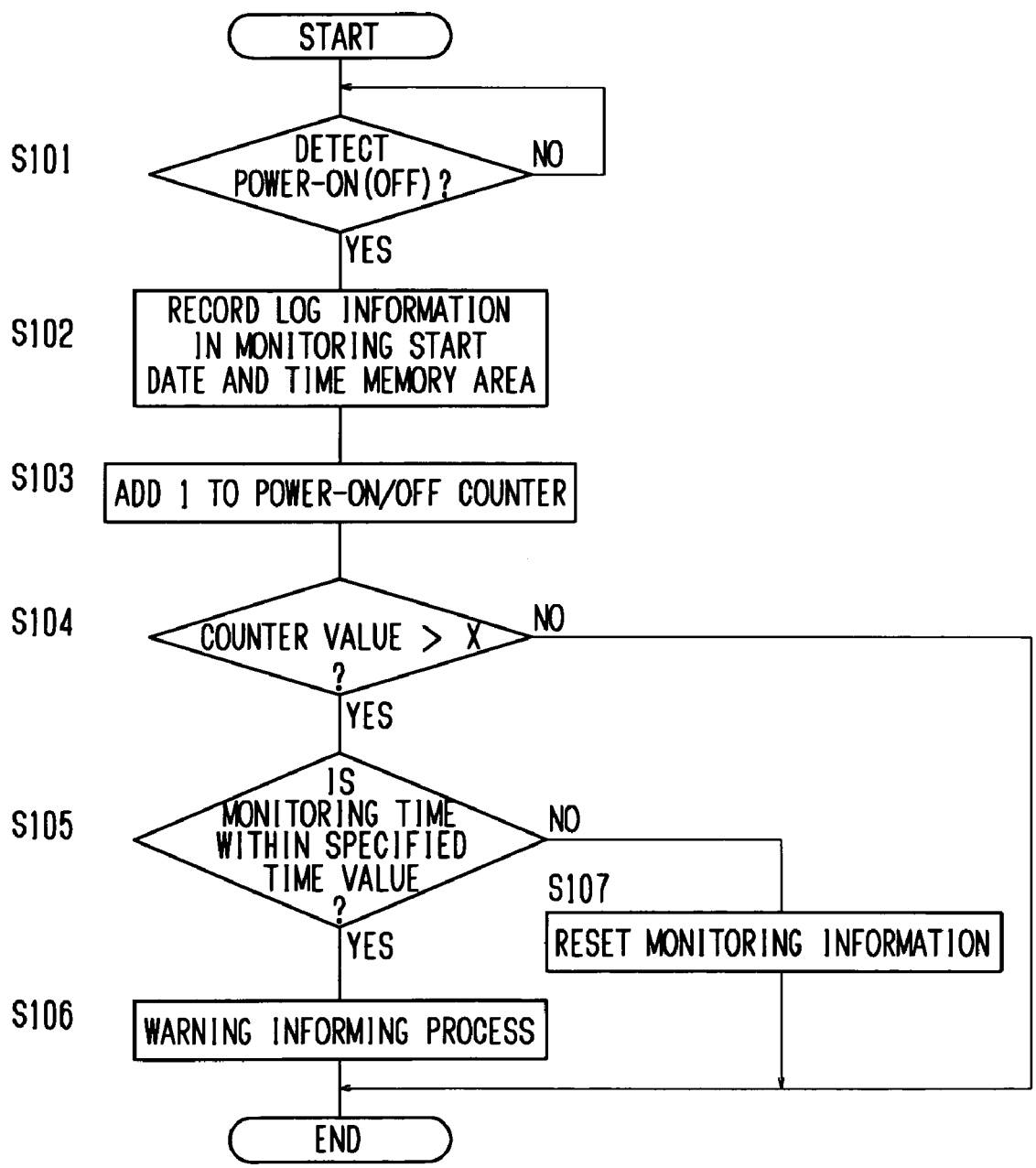

SETTLEMENT TERMINAL

CROSS REFERENCE TO RELATED APPLICATION

The present application is based on Japanese Priority Document P2004-019559 filed on Jan. 28, 2004, the content of which is incorporated herein by reference.

BACKGROUND OF THE INVENTION

1. Field of the Invention

The present invention relates to a settlement terminal having a settlement function, and particularly relates to a settlement terminal which is connected to a settlement organ computer in a settlement organ through a communication line.

2. Discussion of the Background

Electronic payment by use of various cards, instead of cash, is widely used these days. The various cards used for electronic payment include, for example, credit cards and cash cards used in debit card payments.

The electronic payment is executed with the use of a settlement terminal. The settlement terminal reads card data from the various cards and inputs personal identification numbers in settlement processing. In a settlement processing with a credit card, by way of example, the settlement terminal reads, as card data, a credit card number in order to execute the settlement processing. In a settlement processing with a cash card, used in a debit card payment, the settlement terminal reads an account number of a bank as card data, and inputs a personal identification number in order to execute the settlement processing. In a settlement processing, the settlement terminal creates inquiry information on the basis of card data read from the various cards and the inputted personal identification number. The inquiry information is sent through a communication line to a settlement organ computer in a settlement organ to execute an authorization. Upon receiving an approval from the settlement organ computer in response to the inquiry, the settlement terminal executes the settlement processing.

In accordance with the widespread use of electronic payment, theft of card data stored on cards becomes a problem. Card data is fraudulently obtained by skimming, by which information recorded as card data is fraudulently read and copied. Skimming can be easily carried out by equipment called a skimmer. The skimmer is, for example, fraudulently installed into the settlement terminal being used. To install the skimmer into the settlement terminal, a criminal secretly opens a housing of the settlement terminal to install the skimmer inside the housing, and then closes the housing. If the skimmer is installed into the settlement terminal, the skimmer accumulates card data every time the settlement terminal is used. Card data accumulated in the skimmer can be copied down to blank cards, which are new cards having the same standards as the various legitimate cards, by scanning the blank cards. Therefore, fraudulent electronic payment is possible by the illegal use of such counterfeit cards, onto which the card data of other people has been copied.

To solve such a problem, a settlement terminal with a switch for detecting the opening and closing of the housing is proposed. The settlement terminal announces that the housing has been opened, once the switch has detected the opening of the housing. A settlement terminal like this is disclosed in, for example, Japanese Patent Laid-Open Publication No. 2001-256566.

In the settlement terminal disclosed in the Japanese Patent Laid-Open Publication No. 2001-256566, however, if the criminal knows the position of the switch, it is conceivable that the criminal could open the housing after modifying the settlement terminal so as not to activate the switch. In this case the criminal can install the skimmer inside the housing without anybody noticing.

SUMMARY OF THE INVENTION

An object of the present invention is to prevent the skimming of card data used in electronic payment.

A settlement terminal according to the present invention focuses attention on a phenomenon occurring during executing a fraudulent act, in which the settlement terminal is turned on and off several times when a skimmer is installed into the settlement terminal. The settlement terminal detects the power-on/off of the settlement terminal, and determines abnormality in the detected power-on/off event in accordance with an abnormal power-on/off definition stored in a memory. When the power-on/off is determined to be abnormal, the settlement terminal sends warning information to a settlement organ computer in a settlement organ.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 4 is a flowchart showing the flow of a power-on/off monitoring process.

DETAILED DESCRIPTION OF THE PREFERRED EMBODIMENTS

An embodiment of the present invention will be described with reference to the accompanying drawings. A settlement terminal according to this embodiment is connectable to a settlement organ computer of a financial organ as a settlement organ through a communication line. The settlement terminal connected to the settlement organ computer accepts payment by a card such as a credit card, or a cash card used as a debit card (instead of cash). This is possible with the use of data communication with the settlement organ computer. In the card used in the settlement terminal, there is a magnetic stripe or an IC chip. In the case of the credit card, a credit card number (being information specific to the card) is stored as card data on the magnetic stripe or IC chip of the card. In the case of a cash card, stored card data may comprise an account number, a predetermined personal identification number, and the like (being information specific to the card).

Figure 1:
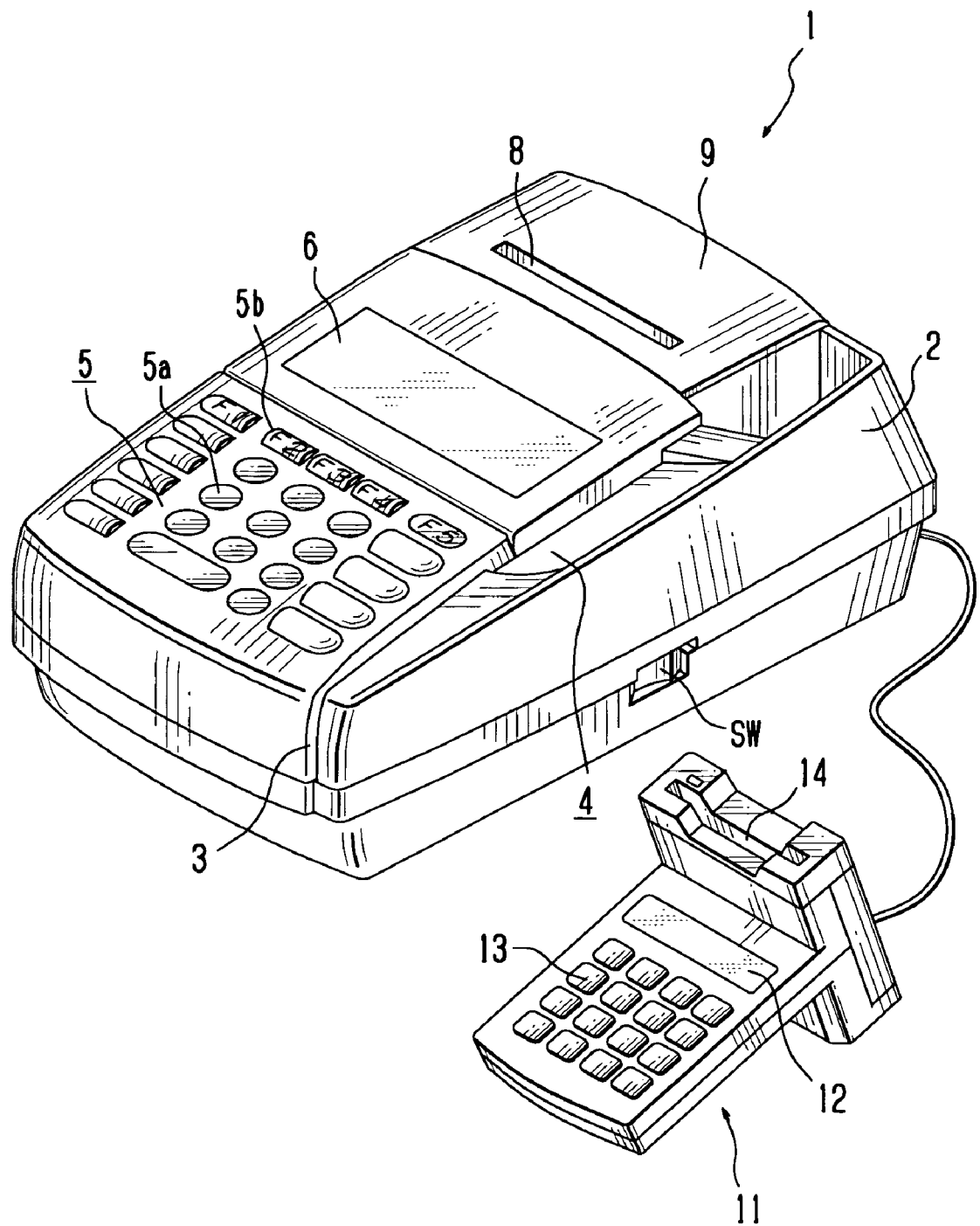
FIG. 1 is a perspective view schematically showing the external appearance of a settlement terminal according to an embodiment of the present invention.

FIG. 1 is a perspective view schematically showing the external appearance of a settlement terminal 1.

As shown in FIG. 1, the settlement terminal 1 has a magnetic card reader section 4 on the right side of a housing 2 when viewed from an operator side of the settlement terminal 1. The magnetic card reader section 4 has a slitshaped reading groove 3, into which the magnetic stripe of a card (being a recording medium for identifying information) is inserted and pulled toward the operator. This magnetic card reader section 4 contains a magnetic card reader 10 (refer to FIG. 2) for reading data recorded on the magnetic stripe of the card.

In the top face of the housing 2, a keyboard 5, a display 6, and a receipt outlet 8 are successively arranged from the operator side of the settlement terminal 1 (the downstream side of a card pull-out direction) to the rear side (the upstream side of the card pull-out direction). The keyboard 5 has such an external appearance that various keys such as numeric keys 5a from "0" to "9" (for inputting an amount and the like) and function keys 5b are arranged block-by-block. The thin and flat-shaped display 6 is an LCD (liquid crystal display) for displaying the contents of a transaction, a guide to operation or the like. The receipt outlet 8 is an outlet for issuing a receipt (not illustrated) printed by a printer 7 (refer to FIG. 2) contained in the housing 2. The receipt outlet 8 is formed in a printer cover 9 detachably attached to the housing 2 in such a manner as to cover the printer 7 contained in the housing 2.

A power supply switch SW for turning on and off the settlement terminal 1 is provided on the side of the housing 2. When the power supply switch SW is turned on, electric power is supplied to each part of the settlement terminal 1, and a microcomputer 15 to which the electric power is supplied makes the settlement terminal 1 workable. Operation in the case where the power supply switch SW is turned off will be described later on.

The settlement terminal 1 has a PIN pad 11 which is separate from the housing 2. The PIN pad 11 is a personal identification number input device for inputting a personal identification number, predetermined card-by-card. The PIN pad 11 comprises a display 12, a keyboard 13, and a card reader and writer section 14. The contents of the transaction, a guide to operation, and the like are displayed on the display 12. The keyboard 13 is composed of a group of various keys such as numeric keys from "0" to "9," for inputting the personal identification number. The card reader and writer section 14 reads/writes various types of data from/into the IC card.

Figure 2:
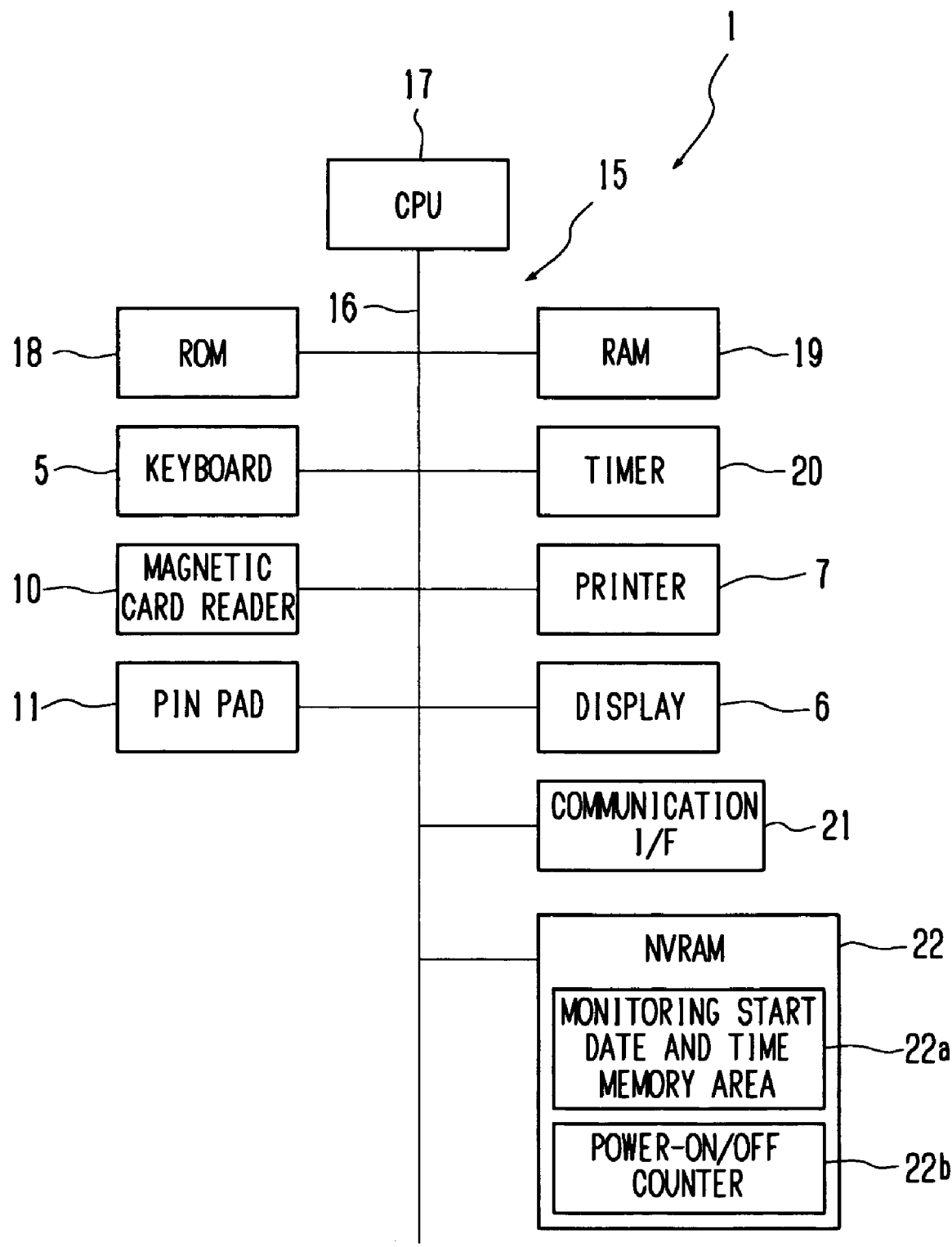
FIG. 2 is a block diagram showing the electric connection of each part provided in the settlement terminal.

FIG. 2 is a block diagram showing the electric connection of each part provided in the settlement terminal 1.

The settlement terminal 1 contains the microcomputer 15. This microcomputer 15 controls the operation of each part described above such as the keyboard 5, the display 6, the printer 7, and the magnetic card reader 10 through a bus line 16 and various control circuits (not illustrated). The microcomputer 15 comprises a bus line 16, a CPU (central processing unit) 17, a ROM (read only memory) 18, a RAM (random access memory) 19, and a timer 20. The ROM 18 stores unchangeable data such as a computer program (a boot program and a control program). The RAM 19 changeably stores various types of data. The ROM 18, the RAM 19, and the timer 20 are connected to the CPU 17 through the bus line 16.

A communication I/F 21, a NVRAM (non-volatile random access memory) 22, and a power supply voltage monitoring circuit 23 are connected to the microcomputer 15 through the bus line 16.

The communication I/F 21 is connected to a settlement organ computer installed in a credit card company, a bank or the like, through a relay station of a public network, a CAFIS (credit and finance information switching system) or the like—being a communication line—to execute data communication with the settlement organ computer.

The NVRAM 22 is a non-volatile memory for changeably storing data. This NVRAM 22 has a monitoring start date and time memory area 22a, as well as a power-on/off counter 22b which are used in the power-on/off monitoring process described later on. The monitoring start date and time memory area 22a stores a date and time (year, month and day, and hour, minute and second) when power-on/off monitoring is started in the power-on/off monitoring process described later on. The power-on/off counter 22b stores a number of times the power supply switch SW is turned on or off since the initialization of the power-on/off monitoring. When the settlement terminal 1 is shipped out from the manufacturer, the monitoring start date and time memory area 22a is set at year 0000, month 00 and day 00, and hour 00, minute 00, and second 00, and the power-on/off counter 22b is set at "0."

The power supply voltage monitoring circuit 23 monitors the voltage of electric power supplied from a power control circuit 24 to each part. When the monitored voltage exceeds a predetermined voltage, the power supply voltage monitoring circuit 23 outputs a turn-on signal to the microcomputer 15. When the monitored voltage is equal to or less than the predetermined voltage, the power supply voltage monitoring circuit 23 outputs a PFL (power fail) signal (low-power supply voltage monitoring signal) to the microcomputer 15. Thus, the power supply voltage monitoring circuit 23 functions as detection means for detecting power-on/off states of the settlement terminal 1.

Figure 3:
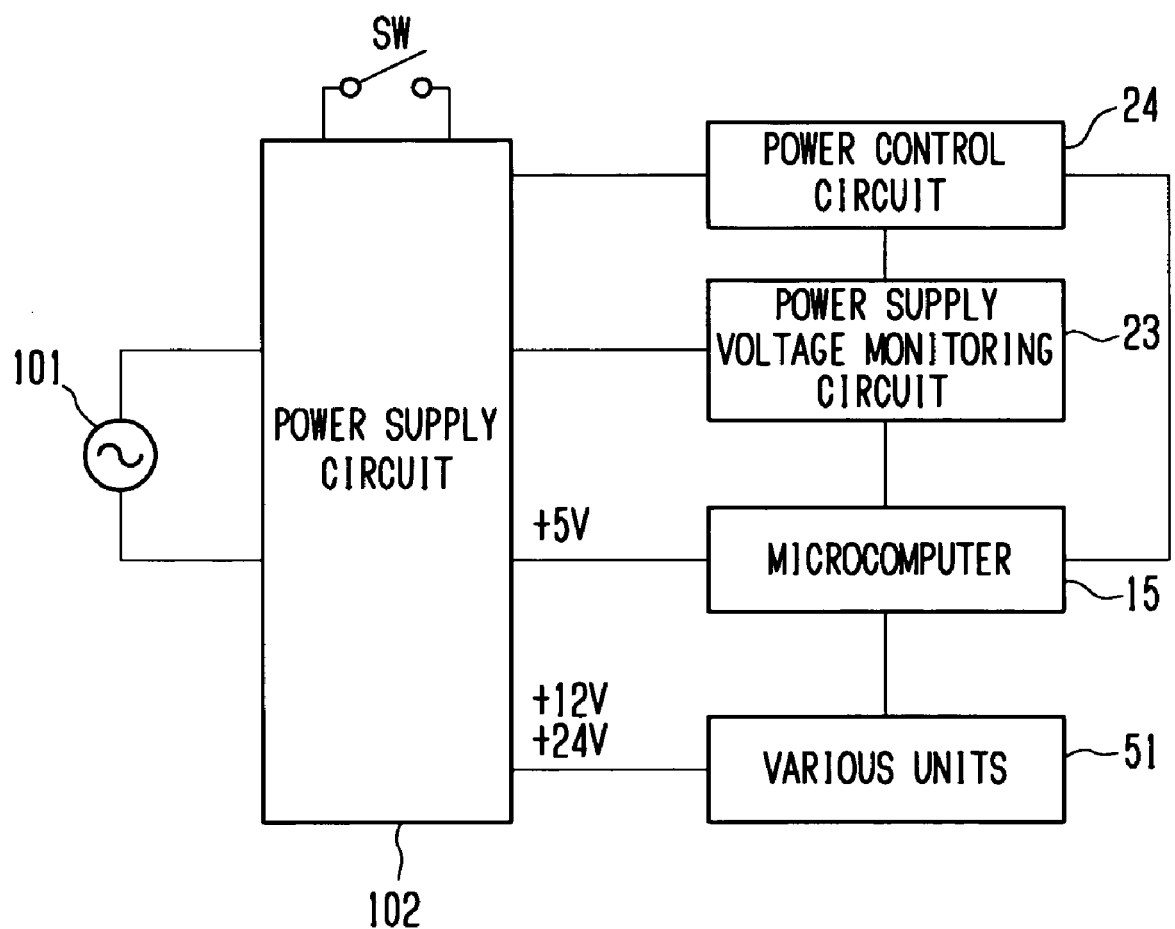
FIG. 3 is a block diagram showing the circuitry of an electric power supply path.

FIG. 3 is a block diagram showing the circuitry of an electric power supply path.

The microcomputer 15 operates at +5V, and various units 51 such as the display 6 and the printer 7 operate at +12V or +24V. Accordingly, in this embodiment, a power supply circuit 102 connected to a commercial power supply 101 is structured so as to supply +5V to the microcomputer 15, and +12V or +24V to the various units 51.

The foregoing power supply switch SW can connect and disconnect electric power supply from the power supply circuit 102 to each part. The status of the electric power supply from the power supply circuit 102 to each part is monitored by the power supply voltage monitoring circuit 23, as described above. When the voltage of the electric power supplied from the power control circuit 24 to each part is equal to or less than the predetermined voltage, the power supply voltage monitoring circuit 23 outputs a PFL (power fail) signal (low-power supply voltage monitoring signal) to not only the microcomputer 15 but also to the power control circuit 24. Upon receiving the PFL (power fail) signal from the power supply voltage monitoring circuit 23, the power control circuit 24 supplies electric power stored in the power supply circuit 102 to the microcomputer 15 so as to maintain the microcomputer 15 in a workable state as long as the electric power lasts.

Various processes which are executed by the CPU 17 following the computer program will now be described.

A settlement processing will be described first. In the case of a settlement processing involving a credit payment, the settlement terminal 1 waits for the input of settlement amount data through the keyboard 5. The settlement terminal 1 creates credit data (inquiry data) on the basis of data read from the magnetic stripe or the IC chip of the card and the settlement amount data. It then sends this created credit data to the settlement organ computer installed in one of the various kinds of financial organs. The settlement organ computer executes a credit authorization process such as a credit check and amount approval on the sent credit data, and then sends authorization result data to the settlement terminal 1. When authorization result data comprises data for approving the payment, the settlement terminal 1 sends printing data to the printer 7 in accordance with the authorization result data, so that a credit voucher is issued from the printer 7. A salesclerk makes a customer sign the issued credit voucher. In the case of a settlement processing involving a debit payment, predetermined data communication is executed with a financial organ such as a bank on the basis of data stored on the IC chip, the personal identification number inputted by the customer with the use of the PIN pad 11 and the like, in addition to data related to the settlement amount. Then, the settlement amount is drawn out of the balance on the corresponding account.

FIG. 4 is a flowchart showing the flow of the power-on/off monitoring process.

The power-on/off monitoring process is executed to protect card data, stored on the card, from theft. A method for fraudulently obtaining card data, as described in "discussion of the background," is that a criminal opens the housing 2 of the settlement terminal 1 to install a skimmer inside the housing 2, and then closes the housing 2. Then, the criminal copies card data accumulated in the skimmer to blank cards. Focusing attention on a phenomenon occurring during executing a fraudulent act, in which the settlement terminal 1 is turned on and off several times when a skimmer is installed into the settlement terminal 1, the settlement terminal 1 according to this embodiment monitors the power-on/off activity of the settlement terminal 1. The settlement terminal 1 according to this embodiment assumes that the settlement terminal 1 is fraudulently modified when there has been an abnormal power-on/off, and sends a warning to the settlement organ computer. There are two types of power-on/off monitoring processes, that is, one is for monitoring power-on, and the other is for monitoring power-off. These two types of power-on/off monitoring processes will be successively described.

In the case of monitoring power-on events, when the power supply switch SW is turned on, and the power control circuit 24 supplies the electric power from the power supply to each part of the settlement terminal 1 to start a boot-up process, the processes shown in FIG. 4 are executed. In these processes, it is determined whether or not the power supply switch SW was turned on (step S101). This determination depends on whether or not the microcomputer 15, functioning as determining means, has received the turn-on signal from the power supply voltage monitoring circuit 23. When it is determined that the power supply switch SW was turned on (YES in step S101), log information is recorded on the monitoring start date and time memory area 22*a* of the NVRAM 22 (step S102), and "1" is added to the power-on/off counter 22*b* of the NVRAM 22 (step S103).

Then, it is determined whether or not the total value of the power-on/off counter 22*b*, to which "1" was added, exceeds a specified value X (step S104). The "specified value" is defined as a part of the program for executing the flowchart shown in FIG. 4, stored in a memory such as, for example, the ROM 18, or is stored in a memory such as, for example, the NVRAM 22 as a program reference value, in order to define an abnormal power-on/off. When the value of the power-on/off counter 22*b* is equal to or less than the specified value X, the power-on is determined to be a normal power supply operation, and the processes shown in FIG. 4 are ended.

On the other hand, if it is determined that the value of the power-on/off counter 22*b* exceeds the specified value X in the step S104 (YES in step S104), it is determined whether the monitoring time from the start of monitoring the power-on/off to the present time is within a specified time value (step S105). In this determination, the date and time when the monitoring of the power-on/off was started is obtained from the monitoring start date and time memory area 22*a* of the NVRAM 22. The monitoring time is calculated by subtracting the power-on/off start date and time from the present date and time, and then the calculated monitoring time is compared with the specified time value. The power-on/off monitoring start date and time is easily obtained by referring to the oldest date and time of the log information recorded in the monitoring start date and time memory area 22*a*. The "specified time value" is defined as a part of the program for executing the flowchart shown in FIG. 4, stored in a memory such as, for example, the ROM 18, or is stored in a memory such as, for example, the NVRAM 22 as a program reference value, in order to define an abnormal power-on/off.

In the step S105, when it is determined that the monitoring time from the start of monitoring the power-on/off to the present time exceeds the specified time value (NO in step S105), the power-on is determined to be a normal power supply operation. Then, the process advances to step S107 to execute a monitoring information reset process. In the monitoring information reset process, any value recorded in the monitoring start date and time memory area 22*a* is cleared, and the value of the power-on/off counter 22*b* is set at "1." The reason why the value of the power-on/off counter 22*b* is set at "1" instead of cleared to "0" is to count the power-on event detected by the process at step S101 at this time.

In step S105, when the power-on/off has been repeatedly executed within the specified time value, and the number of times of the power-on has become the specified value of X or more, it is determined that an abnormal power-on/off operation was executed. Thus, a warning information process for sending warning information to the settlement organ computer through the communication I/F 21 is executed (step S106).

Thus, the processes of steps S102 to S105 are functions for determining abnormal power-on/off events, which are detected by the power supply voltage monitoring circuit 23, including detection means, in accordance with abnormal power-on/off definition data stored in a memory such as the ROM 18. When the determination means determines an abnormal power-on/off from the processes of steps S102 to S105, the function of means for sending the warning information to the settlement organ computer is performed in step S106.

In the case of monitoring power-off events, on the other hand, when the power supply switch SW is turned off and power supply to each part is stopped, the power supply voltage monitoring circuit 23 detects that the voltage of the power supply circuit 102 becomes equal to or less than a predetermined value. Then, the power supply voltage monitoring circuit 23 outputs the PFL (power fail) signal to the microcomputer 15 on the basis of this detection. Thus, the microcomputer 15 determines that the power supply was turned off (step S101). After that, as in the case of monitoring the power-on, the processes of steps S102 to S107 are executed. That is, the processes are executed by substituting "power-on" in the processes for monitoring the power-on, with "power-off." Such processes are executed when the power supply is turned off. In other words, as described above, when the voltage of the electric power supplied from the power control circuit 24 to each part is equal to or less than a predetermined voltage, the power supply voltage monitoring circuit 23 outputs a PFL (power fail) signal to not only the microcomputer 15 but also to the power control circuit 24. Upon receiving a PFL (power fail) signal from the power supply voltage monitoring circuit 23, the power control circuit 24 supplies the microcomputer 15 with electric power stored in the power supply circuit 102, to maintain the microcomputer 15 in a workable state for as long as the stored electric power lasts. Accordingly, the microcomputer 15 can continue to execute the processes of the flowchart as shown in FIG. 4.

The power-on/off monitoring process is not limited to individually monitoring power-on or power-off events. In the power-on/off monitoring process, both of the power-on and the power-off events may be monitored.

When the settlement terminal 1 is turned on and off for a number of times exceeding the specified value of X within the specified time period, as described above, it is determined that an abnormal power-on/off operation such as typically attaching a skimmer to the settlement terminal 1, was performed. Consequently a warning is sent to the settlement organ computer. Therefore, in the settlement terminal 1 according to this embodiment, it is possible to detect the fraudulent events associated with installing a skimmer, such as a repeat of power-on/off events, and to inform the settlement organ computer of a fraudulent modification. Accordingly, the settlement organ can take measures against the theft of card data, and hence it is possible to prevent the theft of card data before it happens.

In another embodiment, the determination means (steps S102 to S105) may determine the abnormality of the power-on/off only during a specified time zone. Namely, prior to the processes shown in FIG. 4, it is determined whether or not the present time is in the specified time zone. Only when the current time is within the specified time zone are the processes shown in FIG. 4 executed. Such a process notes that a fraudulent modification, such as attachment of a skimmer to the settlement terminal 1, is mostly carried out between closing time and opening time while the owner or a responsible person is absent. Accordingly, by defining a time zone between the closing time and the opening time as the "specified time zone," the processes shown in FIG. 4 are executed only when the settlement terminal 1 is turned on during this time zone. The "specified time zone" is defined as a part of the program for executing the flowchart shown in FIG. 4 stored in a memory such as, for example, the ROM 18, or is stored in a memory such as, for example, the NVRAM 22 as a program reference value, in order to define an abnormal power-on/off.

In a further embodiment, the abnormal power-on/off definition stored in a memory is that "an abnormal power-on/off occurrence exists when the settlement terminal 1 is turned on or off during the specified time zone." The determination means may determine that there was the abnormal power-on/off in the settlement terminal 1 when the settlement terminal 1 was turned on or off during the specified time zone. Namely, it is determined whether or not the current time is within the specified time zone. When the current time is determined to be within the specified time zone, it is determined that there was an abnormal power-on/off. This embodiment also notes that a fraudulent modification such as the attachment of the skimmer to the settlement terminal 1 is mostly carried out between closing time and opening time while the owner or a responsible person is absent. Accordingly, by defining the time zone between the closing time and the opening time as the "specified time zone," it is determined that there was the abnormal power-on/off in the settlement terminal 1 when the settlement terminal 1 was turned on during the time zone.

The "specified time zone" is defined as a part of the program for executing the flowchart shown in FIG. 4 stored in a memory such as, for example, the ROM 18, or is stored in a memory such as, for example, the NVRAM 22 as a program reference value, in order to define an abnormal power-on/off.

In the embodiment described above, it may not be determined that there was an abnormal power-on/off in the settlement terminal 1 even when the settlement terminal 1 was turned on or off during the specified time zone. When, for example, the settlement terminal 1 was turned on and off for the number of times exceeding the specified number or this was performed within a specified time value, it may be determined that there was an abnormal power-on/off. To realize such a process, the abnormal power-on/off definition stored in a memory is that "the settlement terminal 1 is turned on or off during the specified time zone" AND "the number of times of the power-on/off exceeds the specified number." Otherwise, the abnormal power-on/off definition is that "the settlement terminal 1 is turned on or off during the specified time zone" AND "the number of times of the power-on/off exceeds the specified number within a specified time value." To be more specific, in the processes shown in FIG. 4, after it is determined that the settlement terminal 1 was turned on or off (YES in step S101), and the processes of steps S102 and S103 are executed, a determination process in which it is determined whether or not the current time is within the specified time zone is added. Only when the current time is within the specified time zone may the process advance to step S104.

Obviously, numerous modifications and variations of the present invention are possible in light of the above teachings. It is therefore to be understood that within the scope of the appended claims, the invention may be practiced otherwise than as specifically described herein.

What is claimed is:

1. A settlement terminal, comprising:
   means for connecting the settlement terminal to a settlement organ computer in a settlement organ through a communication line;
   means for executing a settlement processing with the settlement organ computer via data communication through the communication line;
   means for detecting a power-on/off event of the settlement terminal;
   means for determining whether the detected power-on/off event is abnormal, in accordance with a stored abnormal power-on/off definition; and
   means for sending warning information to the settlement organ computer when the detected power-on/off event is determined to be abnormal.

2. The settlement terminal according to claim 1, wherein the abnormal power-on/off definition includes a specified number of power-on/off events and a specified time period; and
   wherein the determining means determines that the detected power-on/off event is an abnormal power-on/off event if the detection of the power-on/off event by the detecting means causes a number of detected power-on/off events to exceed the specified number of power-on/off events within the specified time period.

3. The settlement terminal according to claim 2, further comprising a non-volatile memory which includes: (i) a memory area that stores a time at which the specified time period begins, and (ii) a counter which is incremented by one each time a power-on/off event is detected by the detecting means so as to store the number of detected power-on/off events.

4. The settlement terminal according to claim 1, wherein the determining means only performs the determination of whether the detected power-on/off event is an abnormal power-on/off event during a specified time zone.

5. The settlement terminal according to claim 1, wherein the abnormal power-on/off definition includes a specified time zone; and
wherein the determining means determines that any power-on/off event detected during the specified time zone is abnormal.

6. The settlement terminal according to claim 1, wherein the abnormal power-on/off definition includes a specified number of power-on/off events and a specified time zone; and
wherein the determining means determines that the detected power-on/off event is an abnormal power-on/off event if the detection of the power-on/off event by the detecting means occurs within the specified time zone and if the detection of the power-on/off event by the detecting means causes a number of detected power-on/off events to exceed the specified number of power-on/off events.

7. The settlement terminal according to claim 6, further comprising a non-volatile memory which includes a counter which is incremented by one each time a power-on/off event is detected by the detecting means so as to store the number of detected power-on/off events.

8. The settlement terminal according to claim 1, wherein the abnormal power-on/off definition includes a specified number of power-on/off events, a specified time period, and a specified time zone; and
wherein the determining means determines that the detected power-on/off event is an abnormal power-on/off event if the detection of the power-on/off event by the detecting means occurs within the specified time zone and if the detection of the power-on/off event by the detecting means causes a number detected of power-on/off events to exceed the specified number of power-on/off events within the specified time period.

9. The settlement terminal according to claim 8, further comprising a non-volatile memory which includes: (i) a memory area that stores a time at which the specified time period begins, and (ii) a counter which is incremented by one each time a power-on/off event is detected by the detecting means so as to store the number of detected power-on/off events.

10. The settlement terminal according to claim 1, wherein the power-on/off event is defined as only an event of turning the settlement terminal on.

11. The settlement terminal according to claim 1, wherein the power-on/off event is defined as only an event of turning the settlement terminal off.

12. The settlement terminal according to claim 1, wherein the power-on/off event is defined as an event of turning the settlement terminal either on or off.

13. A settlement terminal, comprising:
a communication section which connects the settlement terminal to a settlement organ computer in a settlement organ through a communication line, the settlement terminal being operable to execute settlement processing with the settlement organ computer via data communication through the communication line;
a monitoring circuit which detects a power-on/off event of the settlement terminal; and
a control section which determines whether the detected power-on/off event is abnormal, in accordance with a stored abnormal power-on/off definition, and which sends warning information to the settlement organ computer when the detected power-on/off event is determined to be abnormal.

14. The settlement terminal according to claim 13, wherein the abnormal power-on/off definition includes a specified number of power-on/off events and a specified time period; and
wherein the control section determines that the detected power-on/off event is an abnormal power-on/off event if the detection of the power-on/off event by the monitoring circuit causes a number of detected power-on/off events to exceed the specified number of power-on/off events within the specified time period.

15. The settlement terminal according to claim 9, wherein the control section only performs the determination of whether the detected power-on/off event is an abnormal power-on/off event during a specified time zone.

16. The settlement terminal according to claim 13, wherein the abnormal power-on/off definition includes a specified time zone; and
wherein the control section determines that any power-on/off event detected during the specified time zone is abnormal.

17. The settlement terminal according to claim 13, wherein the abnormal power-on/off definition includes a specified number of power-on/off events and a specified time zone; and
wherein the control section determines that the detected power-on/off event is an abnormal power-on/off event if the detection of the power-on/off event by the monitoring circuit occurs within the specified time zone and if the detection of the power-on/off event by the monitoring circuit causes a number of detected power-on/off events to exceed the specified number of power-on/off events.

18. The settlement terminal according to claim 13, wherein the abnormal power-on/off definition includes a specified number of power-on/off events, a specified time period, and a specified time zone; and
wherein the control section determines that the detected power-on/off event is an abnormal power-on/off event if the detection of the power-on/off event by the monitoring circuit occurs within the specified time zone and if the detection of the power-on/off event by the monitoring circuit causes a number detected of power-on/off events to exceed the specified number of power-on/off events within the specified time period.

* * * * *